Sept. 1, 1970 M. KATZ 3,526,038
STRIP MAP PREPARATION DEVICE FOR AIRCRAFT USE
Filed Aug. 14, 1967 2 Sheets-Sheet 1

INVENTOR.
MANUEL KATZ
BY Herbert L. Davis
ATTORNEY

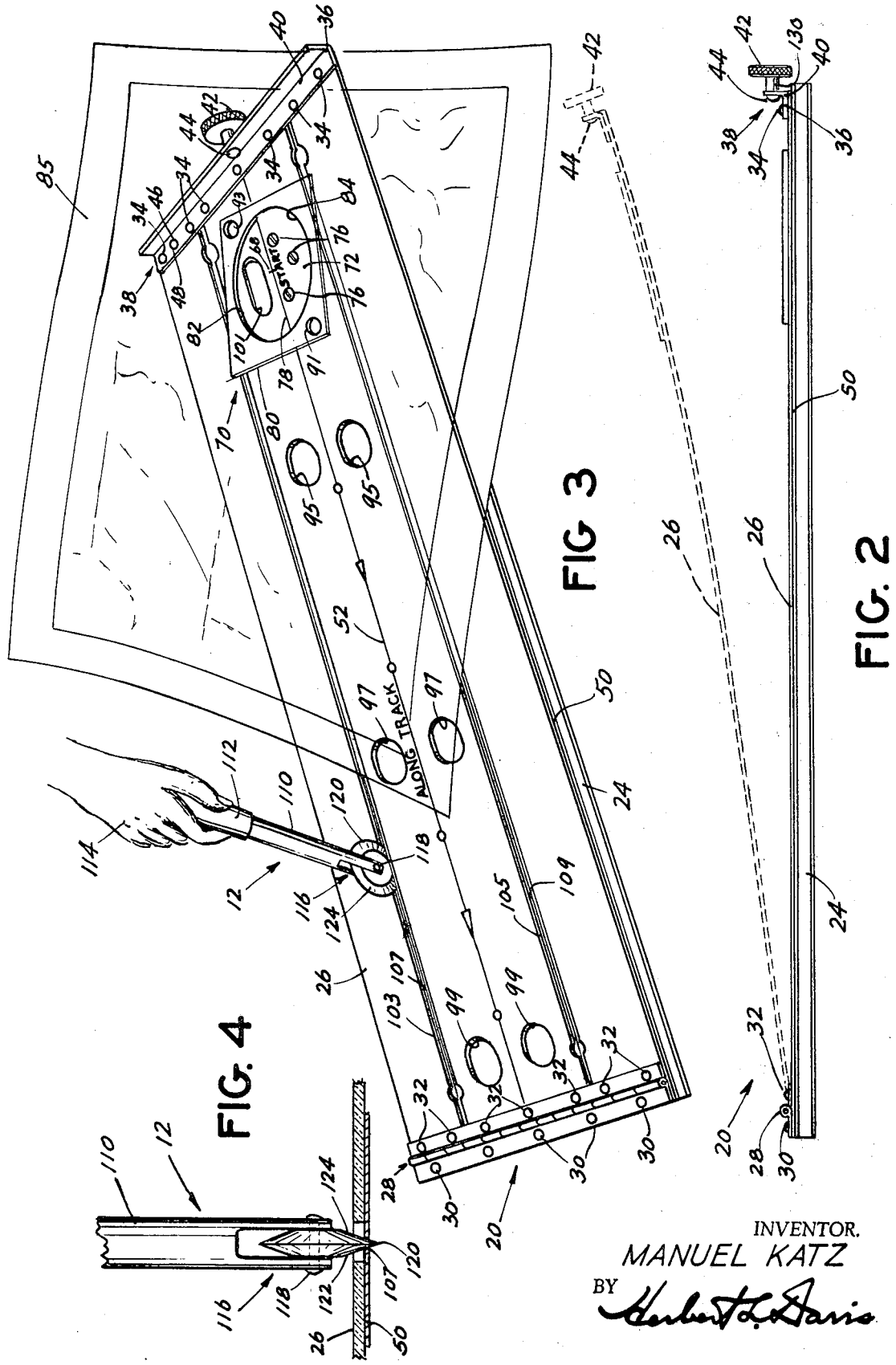

* United States Patent Office *

3,526,038
Patented Sept. 1, 1970

3,526,038
STRIP MAP PREPARATION DEVICE FOR AIRCRAFT USE
Manuel Katz, Monsey, N.Y., assignor to The Bendix Corporation, a corporation of Delaware
Filed Aug. 14, 1967, Ser. No. 660,249
Int. Cl. B431 13/00
U.S. Cl. 33—75                 6 Claims

ABSTRACT OF THE DISCLOSURE

A device for forming a strip map including a base element and a clear plastic clamping element pivotally mounted on the base element, and between which elements there may be clamped a map bearing sheet of paper. The clamping element has inscribed thereon a center guide line along which a predetermined flight track drawn on a map may be aligned as viewed through the clamping element.

Further a clear plastic angularly adjustable protractor element is carried by the clamping element and through which a predetermined position for the start of the flight of the aircraft may be seen on the map. The map may then be so oriented that the flight track drawn on the map passes through the start position on the protractor so that the protractor may thereupon be angularly positioned by the operator so that a north pointing arrow inscribed on the protractor extends parallel to a grid north line shown on the map and viewable through the clear plastic protractor and clamping element. Thereafter the angular direction of the proposed flight path of the aircraft from the start position and along the flight track may be read out by the operator from the protractor and inscribed on the map by the operator through an opening provided in the plastic clamping element.

The plastic clamping element further includes a pair of longitudinal slots extending parallel to the flight track line for guiding a cutting tool to effectively sever the map bearing sheet into a strip map of a predetermined width along the proposed flight track of the aircraft and in alignment with the guide line inscribed on the clamping element.

CROSS-REFERENCE TO RELATED APPLICATIONS

The cutter tool and cutter guide structure, as described herein with reference to FIGS. 3 and 4, is the subject matter of a copending U.S. application Ser. No. 836,055, filed June 24, 1969, while the structure of the cutter tool and work holder combination, as described herein with reference to FIGS. 2 and 3, is the subject matter of a copending U.S. application Ser. No. 836,057, filed June 24, 1969. Both of said applications have been filed by Manuel Katz, the inventor of the present invention, as divisional applications of the present application which is directed to the work holder of the strip map preparation device in which a clear plastic clamping element has a guide line inscribed thereon extending longitudinally in a parallel spaced relation to a guide means for a cutting tool, as described and claimed herein with reference to FIGS. 1 and 2. All of said applications have been assigned by Manuel Katz to The Bendix Corporation, assignee of the present invention.

BACKGROUND OF THE INVENTION

Field of the invention

The invention is in the field of map severing devices which may be utilized to cut a relatively large map bearing sheet of paper into strips of specified widths along a predetermined flight path track for an aircraft from a start position to a predetermined position of destination.

Description of prior art

Heretofore prior devices for preparing a strip map have been found to be inadequate in that, for example, devices of the guillotine paper cutting type were found to be too large, cumbersome, and difficult to use in order to produce two parallel cuts on a relatively large sheet of a map bearing paper.

Another type of prior device utilized a sharp knife held against a guide of specified width. The knife point, however, was pressed into a hard backing surface onto which the map bearing sheet of paper was held. In the second type of device the knife was constantly being dulled and was often subject to replacement. Furthermore, the knife blade was found to permit the knife blade to tilt and produce a nonparallel cut.

A U.S. Pat. No. 3,290,978 granted Dec. 13, 1966, to Dominick Battaglini et al. discloses a different idea of means for cutting a sheet of paper and forming a strip chart and an entirely different problem from that of forming a strip map, while U.S. Pat. No. 2,216,629 granted Oct. 1, 1940, to Edward R. Sabel et al. shows the idea of a paper cutter including two sets of motor driven rotary blades for cutting a sheet of paper into a series of strips forming copies of automobile licenses. Further, U.S. Pat. No. 3,237,497 dated Mar. 1, 1966 to Lawrence H. Cook may be of interest in showing a protractor associated with a cutter so as to cut strips of paper at an angle.

SUMMARY OF THE INVENTION

The prior art fails to suggest the idea of means herein provided for preparing a map bearing strip of paper along a proposed flight track of an aircraft and in a predetermined relation to proposed start and destination positions of the aircraft viewable on a map bearing sheet of paper through a clear plastic clamping element.

Furthermore, the prior art fails to suggest the combination of a clear plastic protractor cooperatively arranged in relation to a clear plastic clamping element through which a map bearing sheet of paper held by the clamping element may be viewed so that the angle of direction of the proposed flight path of the aircraft from the proposed start position and along the flight track may be read out by an operator from the protractor and inscribed on the map. Nor does the art suggest the idea of means herein provided in the present invention for avoiding the heretofore noted difficulties in the prior art in preparing a strip map for developing a flight plan for an aircraft.

The invention is directed to a means for severing a map bearing sheet of paper along two lines extending parallel to a proposed flight track of an aircraft so as to form a strip map oriented in relation to the flight track.

An object of the invention is to provide such a strip map preparation device including a base element and a clear plastic guide and clamping element pivotally mounted on the base element, and between which elements there may be clamped a map bearing sheet of paper securely held therebetween during a parallel cutting operation.

Another object of the invention is to provide such a clear plastic guide and clamping element having inscribed thereon a center guide line along which a proposed flight track for an aircraft may be aligned as viewed through the clear plastic clamping element on a map bearing sheet of paper clamped between the base element and the clamping element.

Another object of the invention is to provide on the clear plastic guide and clamping element a clear plastic angularly adjustable protractor element through which a predetermined position for the start of a flight of an aircraft may be seen on the map, and the map bearing sheet of paper may then be so oriented in relation to the clamping element that the position on the map coincides with an inscribed position on the protractor and clamping element so that the operator may then so angularly position the protractor relative to the map and clamping element that a north pointing indicia inscribed on the protractor extends parallel to a grid north line shown on the map and viewed through the clear plastic protractor and clamping element so that the angular direction of the proposed flight path of the aircraft from the start position and along the flight track may be read out by the operator from indicia on the protractor and then inscribed on the map by the operator through an opening provided in the plastic clamping element.

Another object of the invention is to provide in the clear plastic clamping element of the subject device a pair of longitudinal slots extending parallel to the center guide line corresponding to the proposed flight track of the aircraft and through which an operator may insert a circular knife blade to be positioned in a pair of parallel extending guide slits formed in the base element in coinciding relation with the pair of parallel slots in the clamping element so as to permit the map bearing sheet of paper clamped between the base element and the clear plastic guide and clamping element to be severed by the circular knife blade rotated along parallel cutting lines so as to form the map bearing sheet of paper into a strip map of a predetermined width having the edges thereof an equal distance from the proposed flight track of the aircraft from a proposed predetermined start point to a proposed destination point viewable on the map.

A further object of the invention is to provide a circular cutting knife having a flared hub portion arranged to ride on edges defining the parallel guide slits formed in a base plate so as to permit the cutting edge of the knife to rotate freely in the slit clear of the base plate so that the cutting of the map bearing sheet of paper may be effected along parallel lines with a minimum of wear on the cutting edge of the circular knife.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

DESCRIPTION OF THE DRAWINGS

Referring to the drawings in which corresponding numerals indicate corresponding parts in the several views:

FIG. 2 is a side view of the strip map preparation device of FIG. 1 shown withdrawn from the carrying case and in dotted lines the clear plastic guide and clamping element pivotally mounted on the base element of the device is shown in a raised position for receiving between the clamping and base elements a map bearing sheet of paper for preparation of a strip map.

FIG. 3 is a perspective view of the strip preparation device with a map bearing sheet of paper being shown clamped between the clear plastic guide and clamping element and the base element and with a circular cutting knife held by the hand of an operator with the knife blade positioned in one of the pair of parallel guide slits formed in the base element and preparatory to the severing of the map bearing sheet of paper along one of two parallel cutting lines so as to form a map strip of a predetermined width along the proposed flight track of the aircraft.

FIG. 4 is an enlarged fragmentary sectional view showing the knife blade of the circular cutting knife of FIG. 3 in cooperative relation in the longitudinally extending guide slit formed in the base plate of the map strip preparation device preparatory to effecting a cutting line in the map bearing sheet of paper of FIG. 3.

Figure 1:
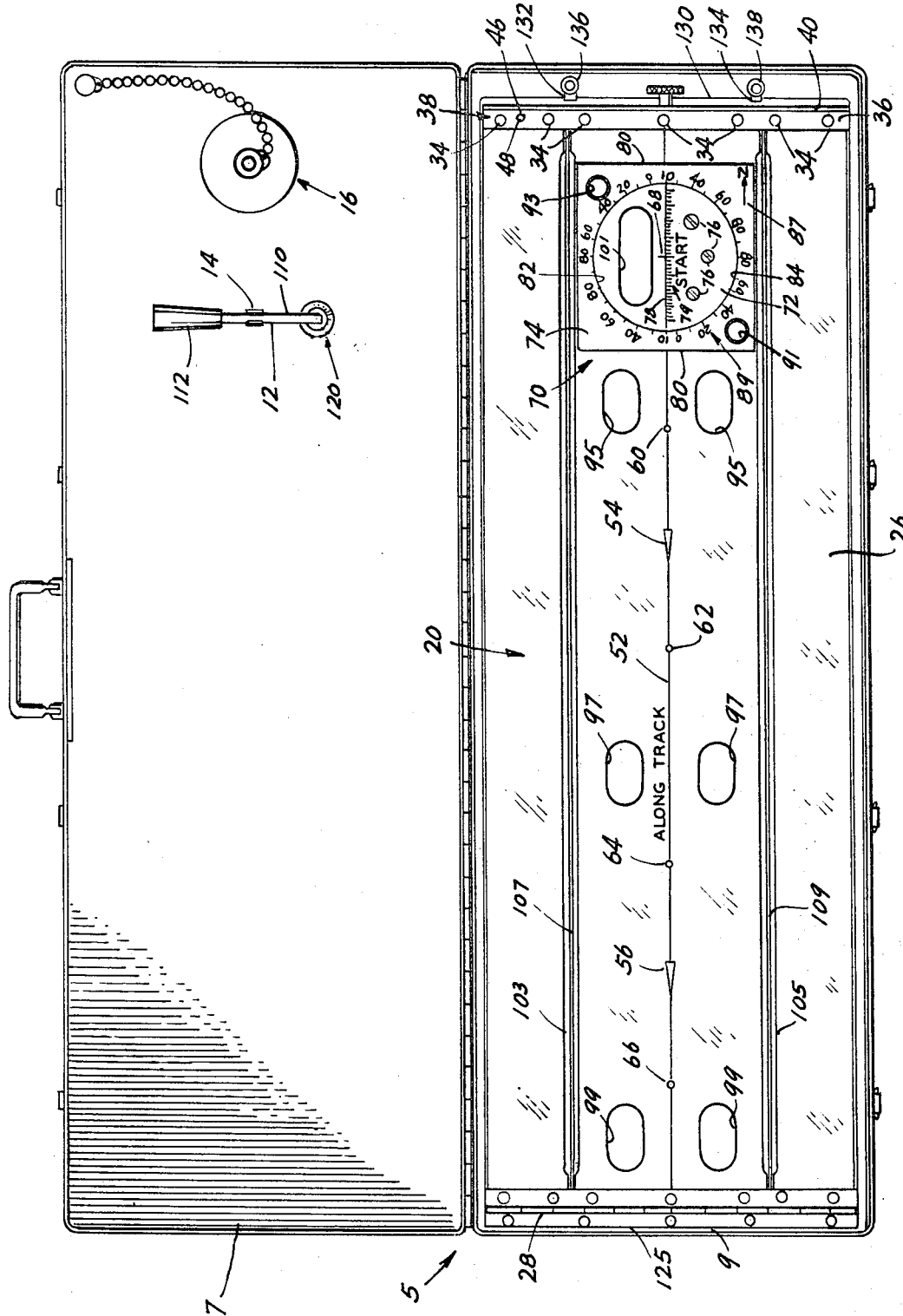
FIG. 1 is a top plan view of a strip map preparation device embodying the invention and shown in assembled relation within a carrying case therefor.

Referring to the drawing of FIG. 1 a map preparation kit is shown enclosed in a carrying case indicated by the numeral 5 and having a top half 7 and a bottom half 9. All of the items required for the preparation of a strip map are provided in the carrying case 10 including a cutting tool 12 held by a bracket secured in the top half 7 of the carrying case 5 and indicated by the numeral 14. Also there is provided a housing 16 for a roll of clear plastic adhesive tape, and a cutting fixture indicated generally by the numeral 20 positioned in the bottom half of the carrying case 5.

The cutting fixture 20 is shown in detail in FIGS. 1, 2 and 3 and includes a flat base member 24 and a flat clear plastic or Plexiglas guide and clamping member 26 pivotally mounted on the base member 24 by a hinge 28 having one half portion thereof affixed by rivets 30 to one end of the base member 24 while the adjacent end of the clamping member 26 is affixed to an opposite half of the hinge 28 by rivets 32.

The opposite end of the clamping member 26 has affixed thereto by rivets 34 a flange portion 36 of an angle bar 38 having another flange portion 40 extending at right angles thereto and across the width of the clear plastic clamping member 26. Affixed to the flange portion 40 of the angle bar 38 is an operating handle 42 which is mounted on the flange portion 40 by a mounting bolt 44. A locating pin 46 projects from the base member 24 and is received in an opening 48 formed in the flange portion 36 of the angle bar 38 so as to ensure a proper positioning of the clear plastic clamping member 26 in a clamping relation to the base member 24. Thus the clamping member 26 may be operatively positioned in relation to base member 24 so as to clamp a map bearing sheet of paper 85 between the clamping member 26 and the base member 24, as shown by FIG. 3. The clamping member 26 may be lifted out of clamping relation with the base member 24 by the operator raising the clamping member 26 by the handle 42 as indicated by dotted lines in FIG. 2.

The guide and clamping member 26 is formed of a flat clear plastic or Plexiglas plate material which fits in a contiguous bearing relation along a flat surface of a plate 50 of the base member 24. There is inscribed in the outer surface of the clear plastic guide and clamping member 26 a center guide line 52 bearing arrows 54 and 56 positioned in spaced relation and pointing towards the hinged end 28 of the cutting fixture 20. Also there is inscribed in the outer surface of the clear plastic member 26 and adjacent the center guide line 52 a notation "ALONG TRACK." Further, there are drilled through the clear plastic material of the clamping member 26 and in spaced relation along the center line 52 a series of pencil point receiving holes 60, 62, 64 and 66 which may be used in making distance measurements and markings along a proposed flight track of an aircraft from a start point 68 inscribed in the center line 52 to a point of destination to be indicated on the clamped map, as viewed through the clear plastic clamping member 26.

Further pivotally mounted on the outer surface of the clear plastic member 26 and adjacent the free end thereof is a protractor 70 having a center point concentric with the start point 68. The protractor 70 is formed of two clear plastic plate like members 72 and 74. The member 72 having a half circle form and being secured to the outer surface of the clamping member 26 by fastening bolts 76. The member 72 has a straight edge 78 extending in alignment with the center line 52. Inscribed on the outer surface of the half circle member 72 is a notation "START" with an inscribed arrow pointing therefrom to the start point 68. Also adjacent the straight edge 78 are inscribed indicia markings 79 for effecting minute distance measurements along an indicated flight track of a map.

The other member 74 of the protractor 70 has an outer form in the shape of a square as indicated by the numeral 80, while an inner surface thereof is of a circular form as indicated by the numeral 82 so as to provide a circular opening therein concentric with the center of the square form of the member 74 and concentric with the start point 68. The inner circumferential surface 82 of the member 74 fits in sliding relation on an arcuate surface 84 of the fixed half circle member 72 so that the member 74 may be angularly positioned by the operator on the arcuate surface 84 and in relation to the fixed half circle member 72. It will be seen then that the angle of the direction of the proposed flight track of an aircraft off the direction of the grid north line appearing on a map 85 positioned in the cutter fixture 20 may be readily determined.

Thus, as indicated by FIG. 3, this may be readily effected by the operator properly aligning a north-south arrow 87 inscribed on the outer surface of the clear plastic number 74 of the protractor 70 with the north grid line on the map 85 as viewable through the clear plastic clamping member 26 and thereafter reading out the angular relation of the "ALONG TRACK" line 52 to the north grid line on the map, as indicated in conventional manner, by the graduations 89 inscribed on the member 74 adjacent the circumferential edge 82, as best seen in FIG. 1.

Finger openings 91 and 93 are provided in opposite diagonal corners of the square angularly movable member 74 of the protractor 70 so as to permit the operator to provide an arcuate adjustment of the member 74 in relation to the fixed half circle 72 to effect the desired protractor measurements, as aforesaid.

Openings 95 and 97 and 99 are further provided in the plastic member 26 in spaced relation and at opposite sides of the center line 52, as shown in FIGS. 1 and 3, so that the operator may inscribe on the clamped map 85 through these openings the angle of the direction of flight of the aircraft off the grid north line appearing on the map 85. A similar opening 101 is also formed in the clamping member 26 within the space provided between the half circle fixed member 72 and the circumferential surface 82 of the member 74 so as to permit the operator to make further inscriptions as desired on the clamped map 85 through the opening 101.

Further longitudinal slots 103 and 105 extend through the clear plastic member 26 in parallel relation to the center line 52 from the angle bar end 38 of the member 26 to the hinged end 28. These longitudinal slots 103 and 105 are arranged in coinciding relation with longitudinally extending parallel slits 107 and 109 extending through the base plate 50 of the base member 24, as best shown in FIGS. 1, 3 and 4.

In forming the map bearing sheet of paper 85 into a strip of a specified width extending along the proposed flight track of the aircraft as indicated by the center guide line 52 there is provided a cutting tool shown in FIGS. 1, 3 and 4 and indicated by the numeral 12.

The cutting tool 12 includes a bar 110 having a handle portion 112 at one end to be grasped by the hand of the operator, as shown in FIG. 3. At the opposite end of the bar 110 is a biffurcated portion 116 in which there is mounted by a shaft 118 a rotary cutter blade 120. The rotary cutter blade 120 has outwardly flared flange like hub portions 122 and 124 arranged to bear on side edges defining the slits 107 or 109, as the case may be, in the base plate 50 as the rotary cutter blade 120 is pulled or pushed along the slit by the hand of the operator 114 in severing the map bearing sheet of paper 85 into a map strip, as shown in FIG. 3.

The wedge like portions 122 and 124 in bearing upon the side edges defining the slits 107 and 109 permit the cutting edge of the circular cutter blade 120 to rotate freely in the slit, as shown by FIG. 4, and clear of the base plate 50 so that the cutting of the map 85 may be effected with a minimum of wear on the cutting edge of the cutter blade 120.

The cutting fixture 20 may be withdrawn from the carrying case 10 for use as shown in FIG. 3 or the same may be assembled in the bottom half 9 of the carrying case 10 for use as indicated in FIG. 1. In assembling the cutting fixture 20 in the bottom half 9 of the carrying case 10, the hinged end 28 of the cutting fixture 20 is positioned under a flanged portion 125 provided at one end of the bottom half 9 of the carrying case 10, while the opposite end of the cutting fixture 20 has an end portion 130 of the base member 24 securely held in position in the bottom half 9 of the carrying case 10 by suitable locking members 132 and 134 secured in position by releasable fastening nuts 136 and 138, respectively.

OPERATION

In a tactical situation the selection of targets and assignments plus the detailed mission planning for the flight of an aircraft is a complex procedure. The strip map preparation device of the present invention was accomplished with these problems in mind.

After detailed mission planning which includes considerations of the takeoff airfield, penetration point, route to target, flight profile data, fixed identification point, return route to recovery base, and fuel loading, a flight plan for the aircraft is developed. The amount of map detail required governs the choice of map scale. The route chosen for each flight leg is stated in terms of the angle from grid north which is a map reference angle.

With the use of the strip map preparation device of the present invention a strip map may be readily prepared with a maximum efficiency. The legs of the flight are marked off on individual maps. Each map is placed in the cutter fixture 20, as shown for example by the map bearing sheet of paper 85 of FIG. 3. The map is clamped between the clear plastic guide and clamping member 26 and the base plate 50 and with the proposed flight track of the aircraft on the map coinciding with the "ALONG TRACK" center guide line 52 inscribed in the outer surface of the clear plastic clamping device 26. The flight track will then be bracketed by two lines corresponding to the slits 107 and 109 in the cutting fixture 20. The nondulling cutting tool 12 is then drawn with the rotary knife edge 120 in one of the slits 107 or 109 across the map and then in the other slit across the map so as to produce a map strip of a specified width, for example, a six-inch wide map strip.

The map reference angle is determined with the aid of the protractor 70 which is attached to the outer surface of the clamping member 26, as heretofore described, with the "START" point 68 thereof coinciding with the start point appearing on the map 85 as viewable therethrough. The member 74 of the protractor 70 is then angularly positioned by the operator so as to position the north-south indicator line 87 parallel to a grid north line shown on the map. In this position the map reference angle may be readily read out by the operator directly in degrees from the indicia 89 of the protractor 70 and noted on the map strip through one of the openings in the clamping member 26, as indicated in FIGS. 1 and 3, by the numerals 95, 97, 99 and 101.

Map strips for additional legs of the flight track of the aircraft are made in the same manner. To join the shorter strips into twelve-foot-long strips, overlap the strips at a common point and form a butt joint and attach the adjoining strips by clear plastic adhesive tape.

As shown in FIG. 1 the map preparation device embodying the present invention may be housed in the carrying case 10 and all items required for the preparation of the strip map included therein. Thus once the flight plan has been determined the strip map may be quickly and easily effectuated.

From the foregoing it will be seen that there is provided in the present invention novel means to slit a relatively large map bearing sheet of paper into strips of specified widths, together with an "ALONG TRACK" guide line 52 by which an operator may readily orient the map in a proposed "ALONG TRACK" direction of flight of an aircraft while reading out from the protractor 70 the angle of the "ALONG TRACK" direction of flight off a grid north line appearing on the map clamped in the cutting fixture 20.

Moreover, the cutting of the strip map is effected along parallel guidelines without dulling the cutting instrument through the provision of a cutting tool 12 having circular cutting blade 120 which is applied to the map bearing sheet of paper in a manner which slits the paper while the cutting edge of the knife blade 120 is freely rotated by being pulled or pushed in the guide slit 107 or 109. The wedge like portions 122 and 124 of the knife blade 120 bear upon the side edges defining the guide slit 107 or 109 so as to permit the cutting edge of the circular cutting blade 120 in being pulled or pushed in the guide slit to rotate freely in the slit, as shown by FIG. 4, and clear of the base plate 50 so that the cutting of the map 85 may be effected with a minimum of wear on the cutting edge of the rotary cutting blade 120.

Although only one embodiment of the invention has been illustrated and described, various changes in the form and the relative arrangements of the parts, which will now appear to those skilled in the art, may be made without departing from the scope of the invention. Reference is, therefore, to be had to the appended claims for a definition of the limits of the invention.

What is claimed is:

1. A device for preparing a map strip, the device comprising:
   a first elongated base member,
   a second elongated guide and clamping member,
   means for operatively connecting the second member to the first member so that the second member may be positioned in a contiguous relation to the first member to effectively clamp therebetween a map bearing sheet,
   the second clamping member being of a clear plastic material so that a proposed flight track for an aircraft may be viewed on the clamped map bearing sheet through the clear plastic second member,
   the first base member including spaced longitudinally extending parallel guide means which may be oriented in a spaced parallel relation to the proposed flight track for guiding a cutting tool to effectively sever the map bearing sheet in such a manner as to prepare said map strip of a predetermined width along the proposed flight track of the aircraft,
   the elongated second member having a guide line inscribed thereon and extending longitudinally in a parallel spaced relation to the longitudinally extending parallel guide means,
   the map bearing sheet being adapted to be oriented between the first and second members so as to align the proposed flight track viewed on the clamped map bearing sheet through the clear plastic second member with the guide line,
   the guide means being thereupon so oriented as to guide the cutting tool so as to effectively sever the map bearing sheet in usch a manner as to prepare said map strip of said predetermined width along the proposed flight track of the aircraft and in alignment with the guide line inscribed on the elongated second member.

2. The device defined by claim 1 in which:
   the spaced longitudinally extending parallel guide means of the first base member includes a pair of spaced longitudinally extending parallel guide slits provided in said first base member,
   and the second guide and clamping member includes a pair of longitudinally extending parallel slots provided therein in coinciding relation with said parallel guide slits so as to permit a cutting tool to be inserted through said slots into said guide slits to effectively sever the map bearing sheet in such a manner as to prepare said map strip of said predetermined width along the proposed flight track of the aircraft.

3. The device defined by claim 2 including:
   a protractor carried on the outer surface of the second member,
   said protractor including a first element of a clear plastic material having a semicircular outer surface with a straight edge surface extending in alignment with the guide line inscribed on the second elongated member,
   a second element having a circular inner surface slidably mounted on the semicircular outer surface of the first element,
   the semicircular outer surface of the first element and the circular inner surface of the second element having a common center point inscribed on the guide line and adapted to coincide with a proposed flight track of the aircraft as viewed on the clamped map bearing sheet through the clear plastic second member and the clear plastic first element of the protractor,
   the second element of the protractor being thereupon angularly adjustable to measure the angular relation of the proposed flight track of the aircraft as viewed on the clamped map bearing sheet through the clear plastic second member and the north grid line appearing on the clamped map.

4. The device defined by claim 1 including:
   a protractor carried on an outer surface of the second member,
   the protractor including a first element of a clear plastic material affixed to the outer surface of the second clamping member,
   the first element having a semicircular outer surface and a straight edge extending in alignment with the guide line inscribed on the second elongated member,
   a second element having a circular inner surface slidably mounted on the semicircular outer surface of the first element,
   the semicircular outer surface of the first element and the circular inner surface of the second element having a common radii with a concentric center point inscribed on the guide line adapted to coincide with the proposed flight track of the aircraft as viewed on the clamped map bearing sheet through the clear plastic second member and the clear plastic first element of the protractor,
   the second element of the protractor being thereupon angularly adjustable to meausre the angular relation of the proposed flight track of the aircraft to the north grid line as viewed on the clamped map bearing sheet.

5. The device defined by claim 1 including:
   the first elongated base member having a pair of longitudinally extending parallel slits,
   the second elongated guide and clamping member having a pair of longitudinally extending parallel slots arranged in coinciding relation with the pair of longitudinally extending parallel slits of the first base member,
   the parallel slots of the second member extending parallel to the guide line inscribed on the elongated second member and permitting access of a cutting tool into the parallel extending coinciding slits of the first member,
   and the parallel extending longitudinal slits of the first member providing the means for guiding the cutting tool to effectively sever the map bearing sheet in such a manner as to prepare said map strip of said predetermined width along the proposed flight track of the aircraft.

6. A device for preparing a map strip, the device comprising:
   a first elongated base member,
   a second elongated guide and clamping member,
   means for operatively connecting the second member to the first member so that the second member may be positioned in a contiguous relation to the first member to effectively clamp therebetween a map bearing sheet.

the second clamping member being of a clear plastic material so that a proposed flight track for an aircraft may be viewed on the clamped map bearing sheet through the clear plastic second member, the first base member including spaced longitudinally extending parallel guide means which may be oriented in a spaced parallel relation to the proposed flight track for guiding a cutting tool to effectively sever the map bearing sheet in such a manner as to prepare said map strip of a predetermined width along the proposed flight track of the aircraft, a protractor carried on an outer surface by the second member, the protractor including a first element of a clear plastic material affixed to the outer surface of the second clamping member, said first element having an arcuate outer surface, a second element having a circular inner surface slidably mounted on the arcuate outer surface of the first element, the inner circular surface and the outer arcuate surface of said second and first element being of a corresponding radii with concentric center points on the proposed flight track for the aircraft as viewed on the clamped map bearing sheet through the clear plastic material of the second member and the first element of the protractor so that the second element may be arcuately adjusted to measure the angular relation of the proposed flight track of the aircraft to that of a grid north line shown on the map bearing sheet clamped between the first and second members.

References Cited

UNITED STATES PATENTS

| | | | |
|---|---|---|---|
| 816,529 | 3/1906 | Burt | 269—87.2 |
| 1,167,435 | 1/1916 | Robertson et al. | 83—520 |
| 1,620,343 | 3/1927 | Hacker | 83—520 X |
| 1,895,754 | 1/1933 | Finkenwirth | 83—455 |
| 2,208,412 | 7/1940 | Doniger | 269—87.2 X |
| 2,661,046 | 12/1943 | Dain | 269—87.2 |
| 2,833,350 | 5/1958 | Merkur | 83—455 |
| 3,199,860 | 8/1965 | Moberg | 269—87.2 |
| 3,213,736 | 10/1965 | Keeton | 83—455 |

FRANK T. YOST, Primary Examiner

U.S. Cl. X.R.

30—292; 33—32, 108; 83—455, 520, 522; 269—87.2